United States Patent Office 3,644,345
Patented Feb. 22, 1972

3,644,345
BENZOXAZOLYL-1,3,4-OXDIAZOLE DERIVATIVES
Adolf Emil Siegrist, Basel, Peter Liechti, Binningen, Erwin Maeder, Aesch, and Leonardo Guglielmetti, Birsfelden, Switzerland, assignors to Ciba Limited, Basel, Switzerland
No Drawing. Continuation-in-part of application Ser. No. 798,258, Feb. 3, 1969, which is a continuation of application Ser. No. 548,413, May 9, 1966. This application July 18, 1969, Ser. No. 843,199
Claims priority, application Switzerland, May 10, 1965, 6,472/65
Int. Cl. C09d 23/16; C07d 85/48, 31/40
U.S. Cl. 260—240 CA 13 Claims

ABSTRACT OF THE DISCLOSURE

New benzoxazolyl-1,3,4-oxdiazole compounds are provided which may be represented by the formula

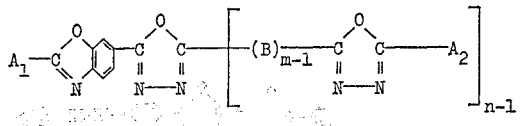

wherein $A_1$ and $A_2$ are identical and each represents phenyl, diphenylyl, naphthyl, styryl, stilbenyl, benzoxazolylphenyl, 1,3,4 - oxdiazolylphenyl, 6 - benzoxazolyl, thienyl, pyridyl, phenylthienyl, benzoxazolylthienyl, phenylbenzoxazolyl or 1,3,4-oxdiazolylthienyl residue; B represents 1,4-phenylene, 2,5-furoylene or 2,5-thienylene, and $m$ and $n$ each is 1 or 2. The benzoxazolyl-1,3,4-oxdiazole compounds of this invention may be further substituted by non-chromophoric, monovalent substituents.

The compounds of the present invention are especially valuable as optical brighteners for organic materials.

CROSS-REFERENCES TO RELATED APPLICATIONS

This is a continuation-in-part of application Ser. No. 798,258, filed Feb. 3, 1969, now abandoned, which in turn is a continuation of Ser. No. 548,413, filed May 9, 1966, now abandoned.

The present invention provides new, valuable benzoxazolyl - 1,3,4 - oxdiazole derivatives containing at least one structural element of the formula (1)

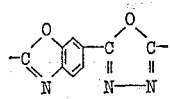

Compounds that contain this structural element of the Formula 1 may correspond, for example, to the general formula (2)

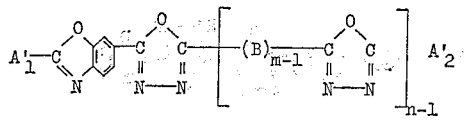

where $A'_1$ and $A'_2$ are identical or different phenyl, diphenylyl, naphthyl, styryl, stilbenyl, benzoxazolylphenyl, 1,3,4-oxdiazolylphenyl, 6-benzoxazolyl, thienyl, pyridyl, phenylthienyl, benzoxazolylthienyl, phenylbenzoxazolyl or 1,3,4-oxdiazolylthienyl residues; B represents a divalent bridge member from the series 1,4-phenylene, 2,5-furoylene and 2,5-thienylene, and $m$ and $n$ each is 1 or 2, and these benzoxazolyl-1,3,4-oxdiazole derivatives may be further substituted by non-chromophoric, monovalent substituents. As derivatives containing non-chromophoric, monovalent substituents there are suitable for practical purposes above all those compounds of the above Formula 2 which contain in terminal aromatic ring systems up to two, and in phenylene nuclei one, substituent(s) such as halogen, alkyl, phenyl, carboxyl, sulpho, hydroxyl or amino groups, and their substitutive or functional derivatives.

Within the scope of the Forumla 2 as defined above non-chromophoric, monovalent substituents in terminal aromatic ring systems or in phenylene nuclei are, apart from the substituent groups specifically mentioned there, also those that can be directly derived therefrom substitutively or functionally, for example apart from alkyl groups also halogenalkyl, hydroxyalkyl, cyanoalkyl carboxyalkyl, phenylalkyl and similar groups; apart from phenyl groups also alkylphenyl, halogenophenyl, alkoxyphenyl, carboxypheny and similar groups; apart from carboxyl groups also carboxylic acid ester, amide, nitrile, hydrazide and similar groups; apart from sulpho groups also sulphonic acid ester or sulphonamide, alkylsulphone and arylsulphone groups, apart from hydroxyl groups also alkoxy, aralkoxy, phenoxy and hydroxyalkoxy groups, apart from free amino groups also alkylated, arylated and acylated amino groups, urethane and urea derivatives, triazinyl derivatives and similar compounds, provided they are non-chromophoric.

The compounds of practical interest therefore can be defined by the formula (1a)

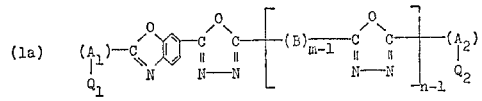

wherein $A_1$ represents a member selected from the group consisting of (a) phenyl, (b) 4-(2-oxdiazol-[1,3,4]-yl) phenyl which is substituted in position 5 of the oxadiazolyl residue with a member selected from the group consisting of phenyl, 2-thienyl, 2-(5-phenyl) thienyl and 4-stilbenyl, (c) 2-(5-phenyl) thienyl, (d) 4-diphenylyl and (e) 4-stilbenyl, (f) styryl, $A_2$ represents a member selected from the group consisting of (a) phenyl, (b) 4-(2-benzoxazolyl)phenyl, (c) 2-thienyl, (d) 2-thienyl substituted in position 5 with a member selected from the group consisting of phenyl and 2-benzoxazolyl, (e) 4-stilbenyl, (e') 4-(4'-phenyl)stilbenyl, (f) β-naphthyl, (g) 4-diphenylyl, (h) α-, β-, or γ-pyridyl and (i) 6-benzoxazolyl substituted in position 2 with a member selected from the group consisting of phenyl, alkyl of 1 to 4 carbon atoms and 2-(5-phenyl)-thienyl, wherein $Q_1$ and $Q_2$ are each a single substituent in the terminal phenyl groups of $A_1$ and $A_2$ and are hydrogen, chlorine, alkyl containing from 1 to 6 carbon atoms and alkoxy containing from 1 to 6 carbon atoms, B represents 1,4-phenylene and wherein $m$ and $n$ each is a whole number 1 or 2.

Important types of compounds of the general Formula 2 may be represented by the following general formulae (3)

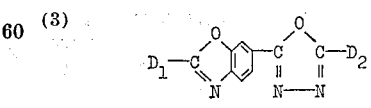

(4)

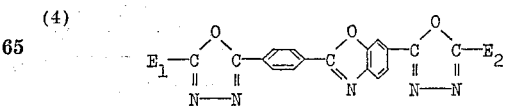

(5)

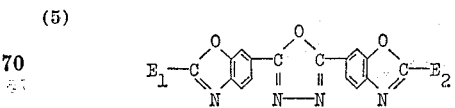

in which formulae $D_1$ and/or $D_2$ is a phenyl, naphthyl, styryl, stilbenyl, thienyl or phenylthienyl residue, or a benzoxazolyl, benzoxazolylphenyl, oxdiazolylphenyl, benzoxazolylthienyl or oxdiazolylthienyl residue; $E_1$ and/or $E_2$ is a phenyl, naphthyl, styryl, stilbenyl, thienyl or phenylthienyl residue, and terminal aromatic ring systems may contain up to two substituents $R_1$ or $R_2$, and each phenylene residue may contain one substituent $R_2$, where $R_1$ is a hydrogen or halogen atom, a linear or branched alkyl group, a phenyl group, a halogenalkyl, hydroalkyl or cyanoalkyl group, a nitrile or hydroxyl group, an alkoxy, aralkoxy or phenoxy group, a carboxyl group, a carboxylic acid ester, amide or hydrazide group, a sulphonic acid, sulphonic acid ester or amide group, an alkylsulphone or arylsulphone group, or an amino group which may be substituted by acyl or 1,3,5-triazinyl residues, and $R_2$ represents a hydrogen or chlorine atom, an alkyl group, a free or neutralized sulphonic acid group $$(-SO_2O = cation)$$

or a sulphonic acid amide group.

The compounds of preferred interest are those of the formula (3a)

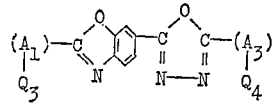

wherein $A_1$ represents a member selected from the group consisting of (a) phenyl,
(b) 4-(2-oxdiazol-[4,3,4]-yl)phenyl which is substituted in position 5 of the oxadiazolyl residue with phenyl, 2-thienyl, 2-(5-phenyl)thienyl and 4-stilbenyl,
(c) 2-(5-phenyl)thienyl,
(d) 4-diphenylyl,
(e) 4-stilbenyl and
(f) styryl, wherein $A_3$ represents a member selected from the group consisting of (a) phenyl,
(b) 4-(2-benzoxazolyl)phenyl,
(c) 2-thienyl,
(d) 2-thienyl substituted in position 5 with phenyl or 2-benzoxazolyl,
(e) 4-stilbenyl,
(e') 4-(4'-phenyl)-stilbenyl,
(f) β-naphthyl,
(g) 4-diphenylyl,
(h) α-, β- or γ-pyridyl,
(i) 4-(2-oxdiazol-[1,3,4]-yl)phenyl substituted in position 5 of the oxadiazolyl with 4-diphenylyl,
(j) 2-oxdiazol-[1,3,4]- yl substituted in position 5 with 6-(2-phenyl)-benzoxazolyl,
(k) 6-benzoxazolyl substituted in position 2 with phenyl, 4-diphenylyl, alkyl of 1 to 4 carbon atoms or 2-(5-phenyl)-thienyl, and wherein $Q_3$ and $Q_4$ are each a single substituent in the terminal phenyl groups in $A_1$ and $A_3$ and are hydrogen, chlorine, alkyl containing from 1 to 6 carbon atoms or alkoxy containing from 1 to 4 carbon atoms.

From the large number of possible constitutions there may be mentioned, for example, for the Formula 3 the Compounds 16 to 28, for Formula 4 the Compounds 29 to 37 and for the Formula 5 the Compounds 38 to 48:

(6) 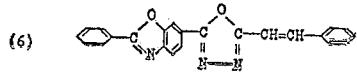

(7) 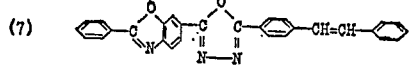

(8) 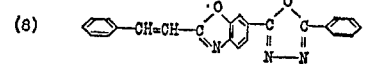

(9) 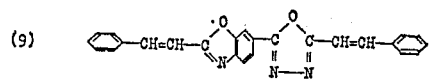

(10) 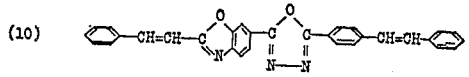

(11) 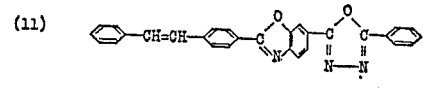

(12) 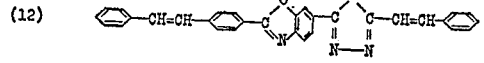

(13) 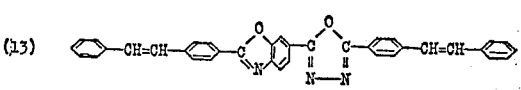

(14) 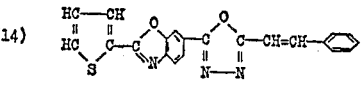

(15) 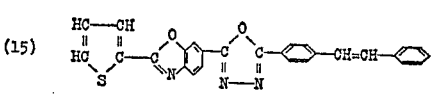

(16) 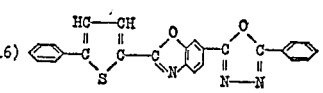

(17) 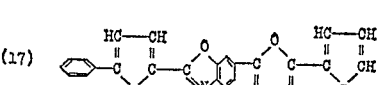

(18) 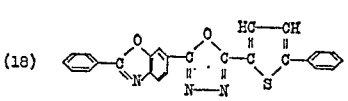

(19) 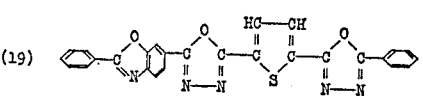

(20) 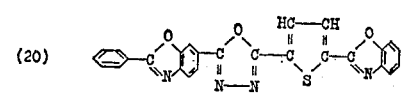

(21) 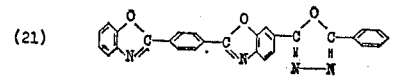

(22) 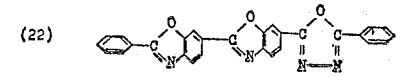

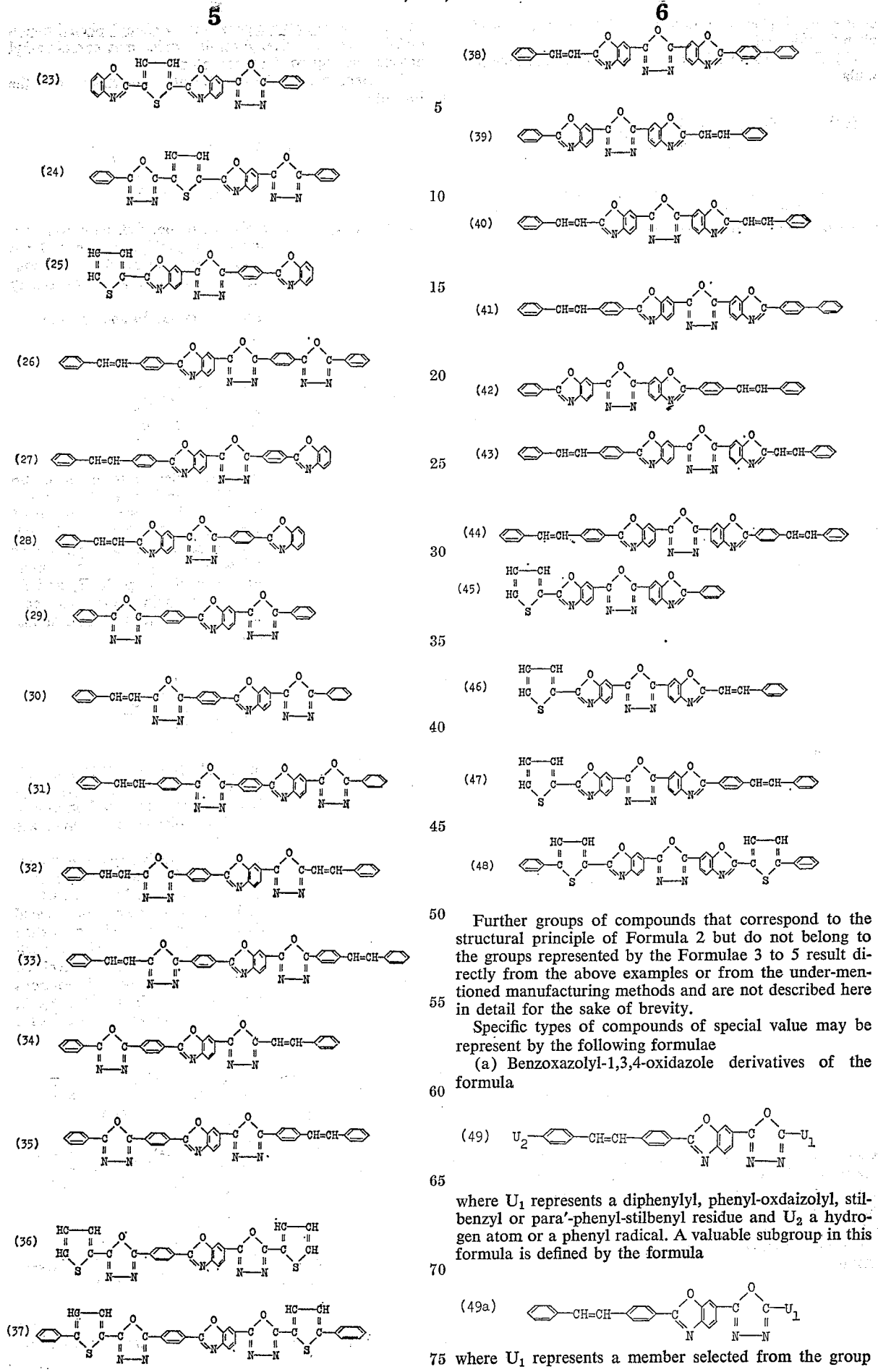

Further groups of compounds that correspond to the structural principle of Formula 2 but do not belong to the groups represented by the Formulae 3 to 5 result directly from the above examples or from the under-mentioned manufacturing methods and are not described here in detail for the sake of brevity.

Specific types of compounds of special value may be represent by the following formulae (a) Benzoxazolyl-1,3,4-oxidazole derivatives of the formula where $U_1$ represents a diphenylyl, phenyl-oxdaizolyl, stilbenzyl or para'-phenyl-stilbenyl residue and $U_2$ a hydrogen atom or a phenyl radical. A valuable subgroup in this formula is defined by the formula where $U_1$ represents a member selected from the group consisting of phenyl, 4-diphenylyl, 4-stilbenyl and 4-(4'-phenyl)-stilbenyl.

(b) Benzoxazolyl-1,3,4-oxdiazole derivatives of the formula

(50) 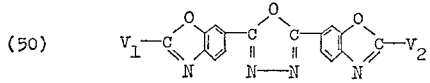

where $V_1$ and $V_2$ represent identical or different phenylthienyl, stilbenyl or phenyl radicals, especially a member selected from the group consisting of phenyl and 2-(5-phenyl)-thienyl.

(c) Benzoxazolyl-1,3,4-oxdiazole derivatives of the formula

(51) 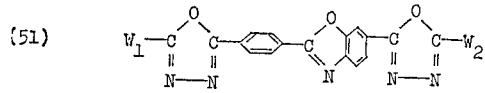

where $W_1$ and $W_2$ represent identical or different phenyl, thienyl, phenylthienyl or stilbenyl radicals, and the terminal rings contain a substituent $R_4$ from the series hydrogen, alkyl containing 1 to 6 carbon atoms or alkoxy containing 1 to 4 carbon atoms. Preferred compounds according to Formula 51 are those of formula (51a) 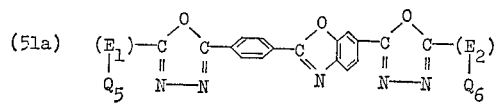

wherein $E_1$ represents a member selected from the group consisting of phenyl, 4-stilbenyl, 2-thienyl and 2-(5-phenyl)-thienyl, $E_2$ represents a member selected from the group consisting of phenyl, 4-stilbenyl, 2-thienyl and 2-(5-phenyl)-thienyl, wherein $Q_5$ and $Q_6$ are each a single substituent in the terminal phenyl groups in $E_1$ and $E_2$ and are hydrogen, chlorine, alkyl having from 1 to 6 carbon atoms or alkoxy having from 1 to 4 carbon atoms.

(d) Benzoxazolyl-1,3,4-oxdiazole derivatives of the formula

(52) 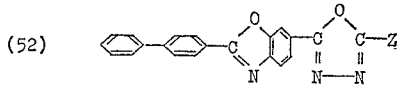

where Z represents a phenyl, diphenylyl, para'-phenyl-stilbenyl or phenyl-benzoxazolyl residue and terminal rings may contain an alkyl group with up to 6 carbon atoms. In this formula Z especially represents a member selected from the group consisting of phenyl, 4-diphenyl, 4-(4'-phenyl)-stilbenyl and 6-(2-phenyl)-benzoxazolyl and is substituted with $Q_7$, $Q_7$ being hydrogen or alkyl having up to 6 carbon atoms.

(e) Benzoxazolyl-1,3,4-oxdiazole derivatives of the formula

(53) 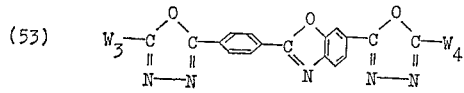

where $W_3$ and $W_4$ are identical or different and each represents a stilbenyl residue or a phenyl radical containing a substituent $R_4$ (being hydrogen, an alkyl group containing 1 to 6 carbon atoms or an alkoxy group containing 1 to 4 carbon atoms).

(f) Benzoxazolyl-1,3,4-oxdiazole derivatives of the formula

(54) 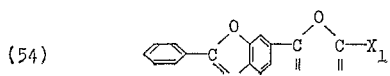

where $X_1$ represents a 2-benzoxazolylphenyl, phenylthienyl or 2-benzoxazolyl thienyl residue which may contain alkyl groups with up to 4 carbon atoms.

(g) Benzoxazolyl-1,3,4-oxdiazole derivtives of the formula

(55) 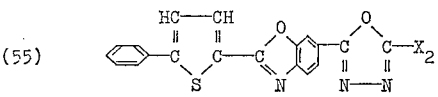

where $X_3$ represents a phenyl, diphenylyl, naphthyl, stilbenyl, thienyl, phenylthienyl or pyridyl residue and the terminal rings may be substituted by alkyl groups containing 1 to 4 carbon atoms, by halogen atoms or alkoxy group ($C_{1-4}$).

Of special interest within Formulas 54 and 55 are compounds having the formula (55a) 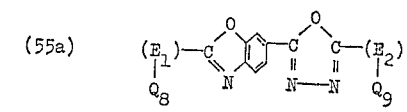

where $E_1$ represents a member selected from the group consisting of phenyl and 2-(5-phenyl)-thienyl, $E_2$ represents a member selected from the group consisting of phenyl, 4-diphenylyl, β-naphthyl, 4-stilbenyl, 2-thienyl, 6-benzoxazolyl substituted in position 2 with phenyl or 2-(5-phenyl)-thienyl, and wherein $Q_8$ and $Q_9$ are single substituent in the terminal phenyl groups in $E_1$ and $E_2$ and are hydrogen, chlorine, alkyl having from 1 to 6 carbon atoms or alkoxy having from 1 to 4 carbon atoms, as well as those of formula (54a) 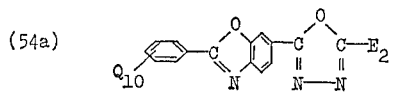

wherein $E_2$ is 4-(2-benzoxazolyl)-phenyl, 2-(5-phenyl)-thienyl or 2-[5-(2-benzoxazolyl)]-thienyl and $Q_{10}$ is hydrogen or lower-alkyl having from 1 to 6 carbon atoms.

The new benzoxazolyl-1,3,4-oxdiazole compounds are accessible by known methods.

For example, according to a generally applicable manufacturing method either a carboxylic acid halide (preferably chloride) of the Formula I is reacted with a carboxylic acid hydrazide of the Formula II or a carboxylic acid hydrazide of the Formula III with a carboxylic acid halide (preferably chloride) of the Formula IV to yield the acyl-hydrazine of the Formula V which latter is then cyclized to form the 1,3,4-oxdiazole. This sequence of reactions may be shown diagrammatically as follows ($A_1$, $A_2$, B, m and n in these formulae having the above meanings):

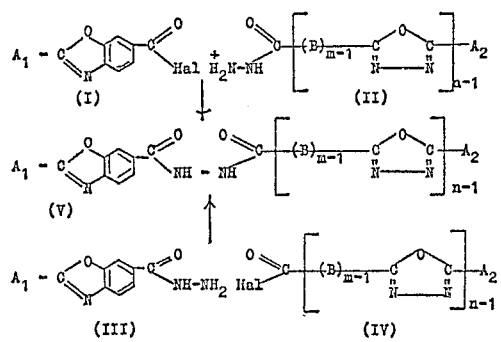

From this principal system there may be directly derived quite analogous routes for which, for example, the following may be shown for the case of $m=2$ and $n=2$ (all symbols again having the above meanings):

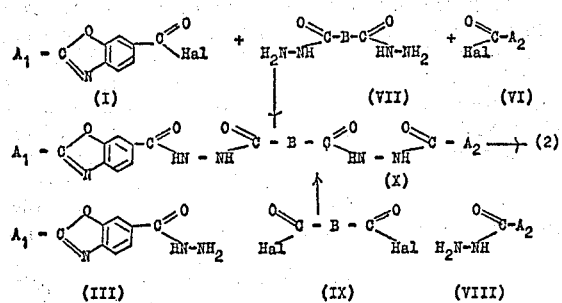

The diacylhydrazine of the Formula X obtained in this manner is likewise cyclized to form the 1,3,4-oxdiazole. In an identical manner, for example, the reaction for the compound type where $n=1$, the Compounds I and VI may be reacted together with hydrazine. The reaction of the halides of the Formula I, IV or VI with hydrazine or its hydrate or salts or carboxylic acid hydrazides of the indicated formulae to yield the corresponding acylhydrazines may be carried out in the presence of a tertiary nitrogen base at a temperature above 50 to about 150° C. The tertiary nitrogen base to be used should not boil too low and is advantageously one that boils at 100° C. or higher, for example N,N-diethylaniline or N,N-dimethylaniline. Particularly good results have been obtained with cyclic tertiary nitrogen bases such as quinoline and above all with pyridine bases such as pyridine itself and alkylpyridines comprising lower alkyls, such as 2-, 3- and 4-methylpyridine (picolines) or ethylpyridines, or with mixture of such pyridine bases.

Especially good results have been achieved by performing the reaction leading to the acylhydrazine of the Formula V or X in a high-boiling, inert, non-polar or at most only weakly polar organic solvent, for example, ortho-dichlorobenzene or trichlorobenzene, in the presence of the stoichiometrically required quantity of pyridine bases, at temperatures from 50° to 150° C., because the subsequent cyclization leading to the 1,3,4-oxdiazole can be performed without intermediate isolation of the acylhydrazine, by dropping in somewhat more than the stoichiometrically required quantity of thionylchloride at a temperature from 120° to 220° C., advantageously at the boiling temperature of these solvents, in a very rapid and smooth manner, that is to say that the compounds of the Formula 1, starting from the hydrazines, can surprisingly be carried out by way of a single-stage process.

If desired, the compounds of the Formula 2 obtained by the processes described above may be used for further reactions. Thus, water-soluble derivatives are obtained when (a) the compound of the Formula 2 is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts;
(b) one or several primary or secondary amino groups of the compound of the Formula 2 is converted with sultones, e.g. with propanesultone or butanesultone at an elevated temperature into the corresponding alkyl-sulphonic acid derivative;
(c) one or several primary amino groups of the compound of the Formula 2 are converted with aldehyde-bisulphite compounds e.g. with formaldehyde-alkali metal bisulphite, into the corresponding ω-methanesulphonic acid derivative;
(d) one or several primary amino groups of the compound of the Formula 2 are reacted with alkylsulphonic or aralkylsulphonic acids, e.g. bromoethanesulphonic acid or benzylchloride-sulphonic acid;

(e) one or several primary or secondary amino groups or hydroxyl groups of the compound of the Formula 2 are linked through s-triazin-2-yl bridges with phenolsulphonic acids or anilinesulphonic acids;
(f) in one or several hydroxyl groups of the compound of the Formula 2 a polyalkylene ether chain is introduced by means of an alkylene oxide such as ethylene oxide or propylene oxide or with a polyalkylene ether monohalide; the said polyalkylene ether chain must be long enough to ensure solubility in water;
(g) one or several groups capable of quaternation present in the compound of the Formula 2 are reacted with quaternating agents e.g. methyliodide, dimethylsulphate, benzylchloride or toluenesulphonic acid alkyl esters at an elevated temperature, if necessary under superatmospheric pressure;
(h) one or several halogenoalkyl groups of the compound of the Formula 2 are converted into the corresponding quaternary derivative with tertiary bases, e.g. pyridine.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

(I) Synthetic organic materials of high molecular weight:
    (a) Polymers based on organic compounds containing at least one polymerizable carbon-to-carbon double bond, i.e. their homopolymers and copolymers and products obtained by after-treating them, such as cross-linked, grafted or decomposition products, polymer dilutions or the like; relveant examples are: Polymers based on α,β-unsaturated carboxylic acids, especially of acryl compounds (e.g. acrylic esters, acrylic acids, acrylonitrile, acrylamides and their derivatives or their methacrylic analogues), of olefinic hydrocarbons (e.g. ethylene, propylene, isobutylene, styrenes, dienes, especially butadiene, isoprene i.e. also rubbers and rubber-like polymers; furthermore so-called ABS polymers), polymers based on vinyl and vinylidene compounds (e.g. vinyl esters, vinylchloride, vinylsulphonic acid, vinyl ethers, vinyl alcohol, vinylidenechloride, vinylcarbazole); of halogenated hydrocarbons (chloroprene, highly halogenated ethylenes), of unsaturated aldehydes and ketones (e.g. acrolein or the like), of allyl compounds or the like; graft polymerization products (e.g. by grafting vinylic monomers), cross-linked products, e.g. by means of bifunctional or polyfunctional cross-linking agents such as divinylbenzene, polyfunctional allyl compounds or bis-acryl compounds, or products accessible by partial decomposition (hydrolysis, depolymerization) or modification of reactive groupings (e.g. esterification, etherification, halogenation, auto-crosslinking).
    (b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts;
    (c) polycondensation products or precondensates based on bifunctional or polyfunctional compounds containing condensable groups, their homo- and co-condensates and products obtained by after-treating them; relevant examples are:

Polyesters, saturated (e.g. polyethylene terephthalate) or unsaturated (e.g. maleic acid-dialcohol polycondensates and their cross-linked products with polymerizable vinyl monomers), linear or branched (also those based on polyhydric alcohols e.g. alkyd resins). Polyamides (e.g. hexamethylenediamine adipate), maleinate resins, melamine resins, phenolic resins (novolaks), aniline resins, furan resins, carbamide resins and their precondensates, and similarly constituted products, polycarbonates, silicone resins and others.

(d) Polyadducts such as polyurethanes (if desired cross-linked), epoxy resins.

(II) Semisynthetic organic materials e.g. cellulose esters or mixed esters (acetate, propionate, nitrocellulose, cellulose ethers, regenerated cellulose [viscose, cuprammonium cellulose]) or products obtained by after-treating them; casein plastics.

(III) Natural organic materials of animal or vegetable origin, e.g. based on cellulose or proteins such as wool, cotton, silk, bast, jute, hemp, furs and hairs, leathers, finely dispersed wood masses, natural resins (such as colophony, especially lacquer resins); furthermore rubber, gutta percha, balata and products obtained by after-treating or modifying them (e.g. by curing, cross-linking), decomposition products (e.g. by hydrolysis, depolymerization, grafting); products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three-dimensional bodies such as blocks, plates, sections, pipes, injection mouldings or components of any desired kind, chips or granulates, foamed articles; predominantly two-dimensional bodies such as films, foils, lacquers, tapes, coatings or impregnations; or predominantly unidimensional bodies such as filaments, fibres, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of continuous filaments, staple fibres, flocks, hanks, textile threads, yarns, doubled yarns, fibre fleeces, felts, cotton-wool, flocculated products or of textile fabrics or textile laminates, knitwear, of papers, cardboards, paper pulps or the like.

The compounds to be used according to this invention are of special value for the treatment of textile organic materials, especially woven textile fabrics. If fibres—which may be stable fibres or continuous filaments, in the form of hanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding composition or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the prepolymer) or a polyaddition.

The new optical brighteners can, of course, also be used whenever organic materials of the kind indicated above are combined with inorganic materials in any desired form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, my vary within wide limits. Even very small amounts, in some cases for instance as little as 0.001% by weight, may suffice to produce a distinct and durable effect, though it is also possible to use amounts of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may also be of advantage to add the products of this invention to the liquors used for producing an anti-crease finish.

(d) In combination with detergents, the detergent and the optical brightener may be added separately to the washing liquor. It is also advantageous to use detergents that as such already contain a share of brightening agent. Suitable detergents are e.g. soaps, salts or sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alklyphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dispersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formulae can be used as scintillators, for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds of the above general formula also dispersants, detergents, carriers, dyestuffs, pigments or dressing agents.

The treatment of the polyester fibres with the brighteners of this invention may also consist, for example, in impregnating these fibres with an aqueous dispersion of the brightener at a temperature below 75° C., for example at room temperature, and then subjecting them to a dry heat treatment at a temperature above 100° C.; in this connection it is in general advantageous first to dry the fibrous material at a moderately raised temperature, for example within the range from at least 60° C. to at most about 100° C. The heat treatment of the dry material is then advantageously carried out at a temperature between 120° and 225° C., for example by heating it in a drying chamber, by ironing it within the indicated temperature range or by treating it with dry, superheated steam. The drying and the dry-heat treatment may also be performed one immediately following upon the other or they may be combined in a single operational step.

In the following Tables Column I=formula number, Column II=structural formula, Column III=melting point in ° C. (uncorrected), Column IV=empirical formula and analytical data (upper line: calculated, lower line: found), Column V=recrystallizing medium which itself is referred to by the following symbols:

1=dimethylformamide
2=ortho-dichlorobenzene
3=trichlorobenzene
4=ortho-dichlorobenzene/tetrachloroethylene
5=tetrachloroethylene
6=chlorobenzene

EXAMPLE 1

A mixture of 8.0 g. of the dicarboxylic acid dichloride of the formula

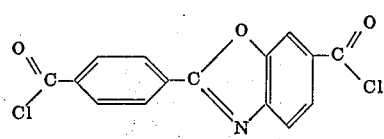
(56)

9.6 g. of para-tertiary butylbenzoic acid hydrazide and 8 g. of pyridine in 200 ml. of anhydrous orthodichlorobenzene is heated within 20 minutes to 100° to 110° C. while being stirred, then further stirred for 1 hour at this temperature and then within 15 to 30 minutes heated to 165° to 170° C. Within 15 minutes at 165° to 170° C. 12 g. of thionylchloride are vigorously stirred into the almost colourless suspension. The yellow, almost completely dissolved reaction product, is further stirred for 5 minutes at this temperature, cooled to about 20° C. 100 ml. of methanol are added, and the precipitated 1,3,4-oxdiazole derivative of the formula

(57)
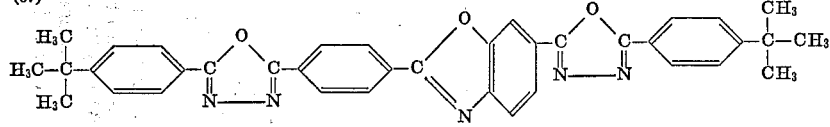

is suctioned off, washed with methanol and dried, to yield about 7.3 g. (=49.0% of theory) of an almost colourless powder melting at 301.5° to 302.5° C. which, after three recrystallizations from dimethylformamide with the aid of active carbon, forms pale-yellowish, very fine needles melting at 310.5° to 311° C.

Analysis.—$C_{37}H_{33}O_3N_5$ (molecular weight: 595.67). Calculated (percent): C, 74.60; H, 5.58; N, 11.76. Found (percent): C, 74.57; H, 5.56; N, 11.77.

The dicarboxylic acid dichloride of the Formula 56 used as starting material can be prepared as follows:

A mixture of 132.5 g. of terephthalic acid monomethyl ester chloride, 112 g. of 4-amino-3-hydroxybenzoic acid methyl ester and ½ litre of anhydrous ortho-dichlorobenzene is stirred, then slowly heated to the reflux temperature, during which at 140 to 150° C. a strong evolution of hydrogen chloride gas sets in. The batch is refluxed for 2 hours whereby a dark solution is obtained; 1 g. of boric acid anhydride is added and the temperature of the reaction mixture is slowly raised to 210° to 215° C., whereby part of the solvent is caused to pass over as an azeotrope with the water of reaction.

The batch is stirred for one hour at this temperature and then allowed to cool. The solidified melt is dissolved in about 4 litres of hot dioxane. The solution is decolorized with 20 g. of active carbon and allowed to crystallize, to yield about 183 g. (=88% of theory) of the compound of the formula

(58)
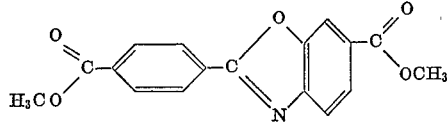

in the form of colourless needles melting at 219° to to 220° C.

Analysis.—$C_{17}H_{13}O_5N$ (molecular weight: 311.28). Calculated (percent): C, 65.69; H, 4.21; N, 4.50. Found (percent): C, 65.33; H, 4.19; N, 4.40.

87 grams of the dicarboxylic acid ester of the Formula 58 in 1.3 litres of ethyleneglycol monomethyl ether are heated to refluxing. Within 10 minutes a solution of 50 g. of sodium hydroxide in 150 ml. of water is then run in. At first, a clear solution is obtained from which the disodium salt immediately settles out as a light-yellow, crystalline precipitate. The batch is refluxed for another 20 minutes, whereupon a specimen of the reaction mixture gives a clear solution in water. The whole is suction-filtered at room temperature and the filter residue is rinsed with methanol and then dissolved in 3 liters of hot water. This solution is decolorized with active carbon and then rendered acid to Congo red with dilute hydrochloric acid. The resulting, voluminous precipitate is suctioned off at room temperature and washed neutral with water. After drying, there are obtained about 68 g. (=86% of theory) of the compound of the formula

(59) 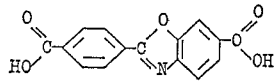

as a colorless powder melting above 350° C.

66.4 grams of the above dicarboxylic acid of the Formula 59 are suspended in 1.2 liters of chlorobenzene. 100 ml. of thionylchloride and 5 ml. of dimethylformamide are added, and the whole is stirred for 16 hours at 90° to 95° C., during which hydrochloric acid gas escapes and a clear solution forms. The bulk of the solvent is suctioned off under vacuum and the residue is mixed with hexane. On filtering with suction, washing the residue with hexane and drying, there are obtained about 68.5 g. (=91% of theory) of the dicarboxylic acid dichloride of the Formula 56 as colorless, fine needles melting from 158° C. to 160° C.

The 1,3,4-oxdiazole derivatives listed in the following Table A are accessible in a similar way:

| I | II | III | IV | V |
|---|---|---|---|---|
| 36 | (structure with HC-CH, O, S, phenyl groups) | 333–334 | $C_{25}H_{13}O_3N_5S_2$: C 60.60, H 2.64, N 14.13; C 60.90, H 2.70, N 14.20 | 1 |
| 37 | (structure with HC-CH, O, S, phenyl) | 379–380 | $C_{37}H_{21}O_3N_5S$: C 68.61, H 3.27, N 10.81; C 68.53, H 3.31, N 10.86 | 2 |
| 60 | (structure with CH₃ tolyl groups) | 357–358 | $C_{31}H_{21}O_3N_5$: C 72.79, H 4.14, N 13.69; C 72.67, H 4.35, N 13.44 | 2 |
| 61 | (structure with OCH₃ groups) | 317–318 | $C_{31}H_{21}O_5N_5$: C 68.50, H 3.89, N 12.88; C 68.31, H 4.05, N 13.14 | 2 |
| 62 | (structure with CH=CH–phenyl groups) | 391–394 | $C_{45}H_{29}O_3N_5$: C 78.59, H 4.24, N 10.18*; C 77.74, H 4.38, N 10.11* | 3 |

*Still contains about 1/20 mol of trichlorobenzene.

EXAMPLE 2

A mixture of 8.5 g. of the carboxylic acid chloride of the formula

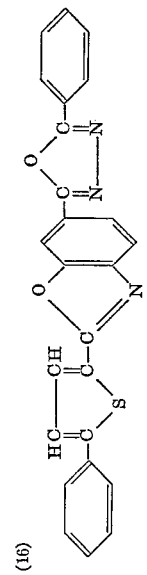

(55)

3.4 g. of mono-benzoylhydrazine and 8 g. of pyridine in 200 ml. of anhydrous ortho-dichlorobenzene is heated within 25 minutes to 100° to 110° C. while being stirred, then further stirred at this temperature for 1 hour, and in the course of 15 to 30 minutes heated to 160° to 165°

C. While vigorously stirring the pale-yellowish solution of the reaction product, 12 g. of thionylchloride are dropped in within 15 minutes at 160° to 165° C. The solution, which by now has turned yellow, is stirred for another 5 minutes at this temperature, then cooled to about 10° C. and during the cooling 200 ml. of methanol are added. The precipitated 1,3,4-oxdiazole derivative of the formula

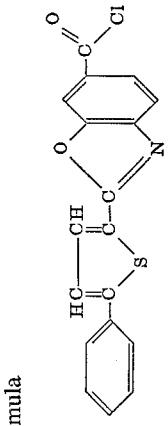

(16)

is suctioned off, washed with methanol and dried, to yield about 8.8 g. (=83.8% of theory) of a light, greenish yellow powder which melts at 258° to 260° C. and after three recrystallizations from ortho-dichlorobenzene with the aid of bleaching earth forms light, greenish yellow, fine crystals which after distillation under a high vacuum melt at 263.5° to 264.5° C.

*Analysis*.—$C_{25}H_{15}O_2N_3S$ (molecular weight: 421.48). Calculated (percent): C, 71.24; H, 3.59; N, 9.97. Found (percent): C, 71.54; H, 3.87; N, 9.89.

The 1,3,4-oxdiazole derivatives shown in the following Table B can be prepared in a similar manner:

| I | II | III | IV | V |
|---|---|---|---|---|
| 64 | (structure: phenyl-thiophene-benzoxazole-oxadiazole-C6H4-C(CH3)3) | 258.5–259 | C29H23O2N3S:<br>C 72.93, H 4.85, N 8.80<br>C 72.65, H 4.92, N 8.71 | 2 |
| 65 | (structure: phenyl-thiophene-benzoxazole-oxadiazole-biphenyl) | 296–297 | C31H19O2N3S:<br>C 74.83, H 3.85, N 8.45<br>C 74.62, H 3.78, N 8.47 | 2 |
| 66 | (structure: phenyl-thiophene-benzoxazole-oxadiazole-naphthyl) | 277–277.5 | C29H17O2N3S:<br>C 73.87, H 3.63, N 8.91<br>C 73.44, H 3.58, N 8.81 | 4 |
| 67 | (structure: phenyl-thiophene-benzoxazole-oxadiazole-C6H4-CH=CH-phenyl) | 307–308 | C33H21O2N3S:<br>C 75.70, H 4.04, N 8.03<br>C 75.46, H 3.81, N 8.09 | 2 |
| 17 | (structure: phenyl-thiophene-benzoxazole-oxadiazole-thiophene) | 272–272.5 | C23H13O2N3S2:<br>C 64.62, H 3.07, N 9.83<br>C 64.76, H 2.95, N 9.61 | 2 |
| 68 | (structure: phenyl-thiophene-benzoxazole-oxadiazole-phenylthiophene) | 323–324 | C29H17O2N3S2:<br>C 69.17, H 3.40, N 8.34<br>C 68.84, H 3.69, N 8.07 | 2 |
| 69 | (structure: phenyl-thiophene-benzoxazole-oxadiazole-2-pyridyl) | 268–268.5 | C24H14O2N4S:<br>C 68.23, H 3.34, N 13.26<br>C 68.42, H 3.48, N 13.43 | 1 |
| 70 | (structure: phenyl-thiophene-benzoxazole-oxadiazole-3-pyridyl) | 282.5–283 | C24H14O2N4S:<br>C 68.23, H 3.34, N 13.26<br>C 68.42, H 3.36, N 13.49 | 1 |
| 71 | (structure: phenyl-thiophene-benzoxazole-oxadiazole-4-pyridyl) | 301–302 | C24H14O2N4S:<br>C 68.23, H 3.34, N 13.26<br>C 68.19, H 3.47, N 13.45 | 1 |
| 72 | (structure: phenyl-thiophene-benzoxazole-oxadiazole-C6H4-CH3 (para)) | 288–288.5 | C26H17O2N3S:<br>C 71.71, H 3.93, N 9.65<br>C 71.46, H 4.09, N 9.48 | 2 |
| 73 | (structure: phenyl-thiophene-benzoxazole-oxadiazole-C6H4-CH3 (meta)) | 259.5–260 | C26H17O2N3S:<br>C 71.71, H 3.93, N 9.65<br>C 71.41, H 4.06, N 9.43 | 5 |
| 74 | (structure: phenyl-thiophene-benzoxazole-oxadiazole-C6H4-Cl) | 298.5–299 | C25H14O2N3SCl:<br>C 65.86, H 3.10, N 9.22<br>C 65.65, H 3.05, N 9.21 | 2 |
| 75 | (structure: phenyl-thiophene-benzoxazole-oxadiazole-C6H4-OCH3) | 278.5–279 | C26H17O3N3S:<br>C 69.17, H 3.80, N 9.31<br>C 68.84, H 3.98, N 9.17 | 2 |

| I | II | | III | IV | V |
|---|---|---|---|---|---|
| 76 | 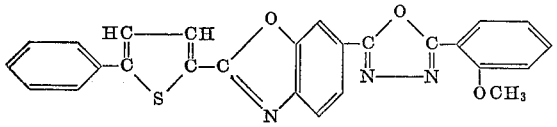 | 222.5-223 | $C_{28}H_{17}O_3N_3S$:<br>C 69.17, H 3.80, N 9.31<br>C 68.95, H 3.99, N 9.17 | | |

The carboxylic acid chloride of the Formula 63 used as starting material can be prepared in the following manner:

33.4 grams of 5-phenyl-thiophene - 2 - carboxylic acid chloride and 25 g. of 4-amino - 3 - hydroxybenzoic acid methyl ester in ½ litre of anhydrous xylene are stirred and refluxed for 4 hours, whereupon no more hydrochloric acid gas is being evolved. The batch is cooled to room temperature, and the reaction product suctioned off and washed with methanol and dried, to yield about 49.2 g. (=93% of theory) of the amide of the formula (77)

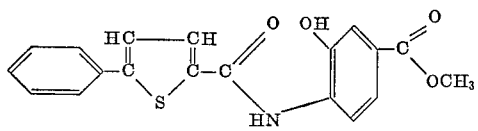

in the form of a light-beige powder which melts and decomposes at 267° C. and after two recrystallizations from dioxane forms bundles of pale-yellow needles which melt and decompose at 268° C.

Analysis.—$C_{19}H_{15}O_4N_3$ (molecular weight: 353.33). Calculated (percent): C, 64.58; H, 4.28; N, 3.96. Found (percent): C, 64.82; H, 4.36; N, 3.83.

A mixture of 46.0 g. of the amide of the Formula 77 and 70 ml. of dibutylphthalate is heated with stirring and exclusion of air to 310° C. and then stirred on for 5 minutes at 310° to 315° C., allowed to cool, during the cooling 100 ml. of methanol are added, and the whole is finally cooled to room temperature. The precipitate formed is suctioned off, washed with methanol and dried, to yield about 40.0 g. (=91.7% of theory) of the ester of the formula (78)

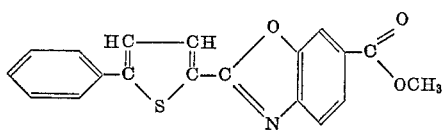

which melts at 200° to 201° C. and, after recrystallization from dioxane with the aid of active carbon, forms light-yellow crystals which after distillation under a high vacuum melt at 203.5° to 204° C.

Analysis.—$C_{19}H_{13}O_3NS$ (molecular weight: 335.38). Calculated (percent): C, 68.04; H, 3.91; N, 4.18. Found (percent): C, 68.24; H, 3.87; N, 4.17.

26.3 grams of the ester of the Formula 78 are dissolved in 900 ml. of absolute ethanol and hydrolyzed by being refluxed for 4 hours with a solution of 16 g. of sodium hydroxide in 40 ml. of water. The batch is cooled to about 50° C., suctioned and the filter cake is washed with methanol, then acidified in 1.5 litres of water at 80° C. with 50 ml. of concentrated hydrochloric acid while being stirred, stirred on for 15 minutes, suctioned and the filter residue is washed neutral with water and dried, to yield about 25.3 g. (=100% of theory) of the carboxylic acid of the formula (79)

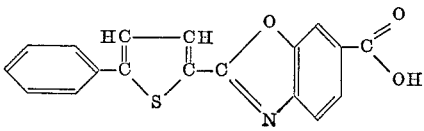

which after two recrystallizations from dimethylformamide melts at 287° to 288° C.

Analysis.—$C_{18}H_{11}O_3NS$ (molecular weight: 321.35). Calculated (percent): C, 67.28; H, 3.45; N, 4.36. Found (percent): C, 66.80; H, 3.57; N, 4.58.

22.3 grams of the carboxylic acid of the Formula 79 are stirred in 750 ml. of chlorobenzene; 75 ml. of thionylchloride and 2 ml. of dimethylformamide are added and the batch is allowed to react for 2 hours at 120° C. After this period another 75 ml. of thionylchloride and 2 ml. of dimethylformamide are added and the whole is stirred for another 2 hours at 120° C. The excess thionylchloride together with about half the solvent is distilled off, the distillation residue is filtered while still hot and then allowed to cool. The carboxylic acid chloride of the Formula 63 forms small, yellow crystalline needles which after suctioning, washing with n-hexane and drying melt at 196° to 198° C. Yield: about 20 g. (=83.5% of theory). After two recrystallizations from chlorobenzene the melting point rises to 199° to 200° C.

Analysis.—$C_{18}H_{10}O_2NSCl$ (molecular weight: 339.80). Calculated (percent): C, 63.63; H, 2.97; N, 4.12; Cl, 10.43. Found (percent): C, 63.58; H, 2.99; N, 4.01; Cl, 10.47.

EXAMPLE 3

A mixture of 3.13 g. of the carboxylic acid chloride of the formula (80)

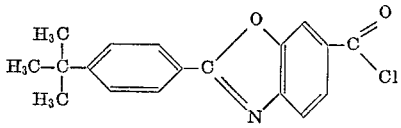

2.53 g. of 4-[benzoxazolyl - (2')] - benzoic acid hydrazide of the formula (81)

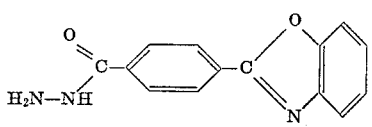

and 1.6 g. of pyridine in 100 ml. of anhydrous ortho-dichlorobenzene is heated within 25 minutes to 100° to 110° C. while being stirred, then further stirred for 1 hour at this temperature and then within 20 minutes heated to 130° to 135° C. In the course of 30 minutes at 130° to 135° C. 2.5 ml. of thionylchloride are dropped into the pale-yellow reaction product. The batch is stirred for another 30 minutes at 130° to 135° C., then cooled to about 5° C. and during the cooling 200 ml. of methanol are added. The 1,3,4-oxdiazole of the formula (82)

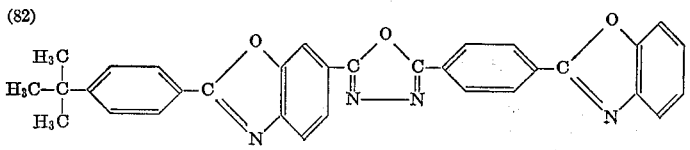

is suctioned off, washed with methanol and dried, to yield about 4.4 g. (=85.9% of theory) of a light-beige, finely crystalline powder which melts at 336° to 337° C. and after three recrystallizations from ortho-dichlorobenzene with the aid of bleaching earth furnishes about 30 g. (=58.5% of theory) of colourless, fine, felted needles melting at 338° to 339° C.

*Analysis.*—$C_{32}H_{24}O_3N_4$ (molecular weight 512.54). Calculated (percent): C, 74.98; H, 4.72; N, 10.93. Found (percent): [1] C, 74.46; H, 4.76; N, 10.73.

The following 1,3,4-oxdiazole derivatives are accessible in a similar way:

(83)

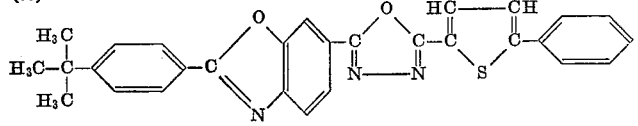

in a yield of 88.0% of the theoretical, in almost colourless, very fine crystals from tetrachloroethylene, melting at 270° to 270.5° C.

*Analysis.*—$C_{29}H_{23}O_2N_3S$ (molecular weight: 477.59). Calculated (percent): C, 72.93; H, 4.85; N, 8.80. Found (percent): C, 72.83; H, 4.80; N, 8.74.

(84)

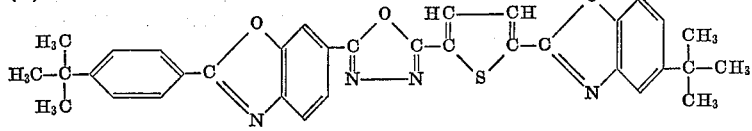

in a yield of 88.7% of the theoretical, as a faintly greenish yellow, finely crystalline powder from tetrachloroethylene, melting at 324° to 324.5° C.

*Analysis.*—$C_{34}H_{30}O_3N_4S$ (molecular weight: 574.70). Calculated (percent): C, 71.06; H, 5.26; N, 9.75. Found [2] (percent): C, 70.23; H, 5.29; N, 9.67.

(85)

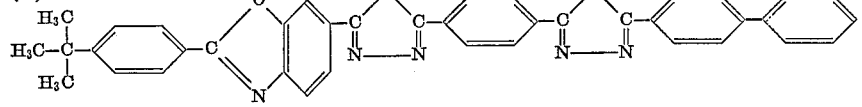

in a yield of 89.3% of the theoretical, in colourless, very fine needles from ortho-dichlorobenzene, melting at 351° to 352° C.

*Analysis.*—$C_{39}H_{29}O_3N_5$ (molecular weight: 615.69). Calculated (percent): C, 76.08; H, 4.75; N, 11.37. Found (percent): C, 75.89; H, 4.86; N, 11.34.

The carboxylic acid chloride of the Formula 80 used as starting material is accessible by the following route:

A mixture of 197 parts of para-tertiary butylbenzoic acid chloride, 167 parts of 4-amino-3-hydroxybenzoic acid methyl ester, 1 part by volume of pyridine and 1000 parts by volume of ortho-dichlorobenzene is stirred under nitrogen. The reaction mixture is then further worked up as described in Example 2 for the compound of the Formula 78, to yield about 277 parts (=90% of theory) of the compound of the formula (86)

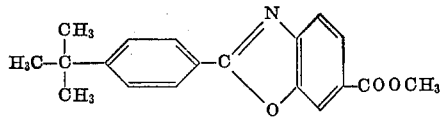

[1] Still contains a trace of ortho-dichlorobenzene.
[2] Still contains traces of tetrachloroethylene.

as a white, crystalline powder which melts at 123° to 125° C. and furnishes from methanol+methylenechloride white, small needles melting at 129° to 130° C.

*Analysis.*—$C_{19}H_{19}O_3N$ (molecular weight: 309.35). Calculated (percent): C, 73.76; H, 6.19; N, 4.53%. Found (percent): C, 73.56; H, 6.01; N, 4.71%.

A solution of 50 parts of sodium hydroxide pellets in 100 parts by volume of water is diluted with 2000 parts by volume of alcohol and refluxed. 263 parts of carboxylic acid ester of the Formula 86 are slowly stirred in. The reaction mixture is further worked up as described in Example 2 for the compound of the Formula 77, to yield about 220 parts (=76% of theory) of the compound of the formula (87)

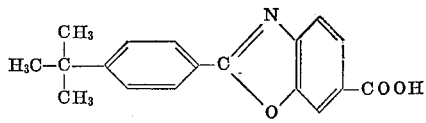

as a colourless powder which melts at 247 to 253° C., and from chlorobenzene furnishes colourless, fine crystals melting at 259° to 262° C.

*Analysis.*—$C_{18}H_{17}O_3N$ (molecular weight: 295.33). Calculated (percent): C, 73.20; H, 5.80; N, 4.74. Found (percent): C, 73.23; H, 5.76; N, 4.69.

215 parts of the above carboxylic acid of the Formula 87 are suspended in 2000 parts by volume of chlorobenzene. 300 parts by volume of thionylchloride and 6 parts by volume of dimethylformamide are then added as described in Example 2 for the compound of the Formula 63, and the reaction mixture is further processed in the same way, to yield about 206 parts (=90% of theory) of the carboxylic acid chloride of the formula (80)

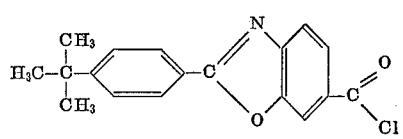

in the form of pale-yellow, fine needles which melt at 132° to 133° C. and from hexane furnishes colourless, fine needles melting at 135° to 136° C.

*Analysis.*—$C_{18}H_{16}NO_2Cl$ (molecular weight: 313.77). Calculated (percent): C, 68.90; H, 5.14; N, 4.46; Cl, 11.30. Found (percent): C, 68.84; H, 4.93; N, 4.44; Cl, 11.44.

EXAMPLE 4

A mixture of 6.58 g. of the carboxylic acid hydrazide of the formula

(88)
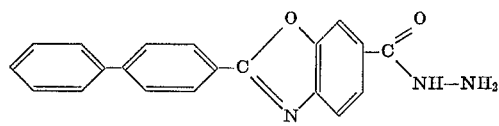

2.81 g. of benzoylchloride and 3.2 g. of pyridine in 200 ml. of anhydrous ortho-dichlorobenzene is reacted with 5 ml. of thionylchloride as described in Example 3, to yield about 6.0 g. (=72.2% of theory) of the 1,3,4-oxdiazole derivative of the formula

(89)
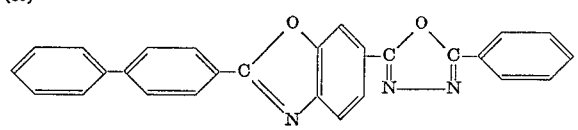

which is recrystallized from dibutylphthalate+methanol and then from ortho-dichlorobenzene to form colourless, shiny flakes melting at 241.5° to 242° C.

*Analysis.*—$C_{27}H_{17}O_2N_3$ (molecular weight: 415.45). Calculated (percent): C, 78.06; H, 4.12; N, 10.11. Found (percent): C, 77.90; H, 4.30; N, 10.32.

The 1,3,4-oxdiazole derivatives listed in the following Table C may be prepared in a similar manner, the crude product in each case being recrystallized once from dibutylphthalate+methanol:

EXAMPLE 5

A mixture of 3.55 g. of the carboxylic acid hydrazide of the formula

(94)
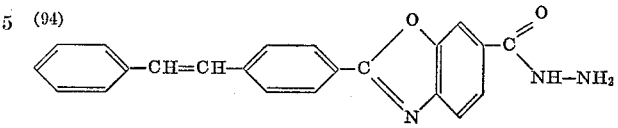

2.17 g. of diphenyl-4-carboxylic acid chloride and 1.6 g. of pyridine in 100 ml. of anhydrous ortho-dichlorobenzene is reacted with 2.5 ml. of thionylchloride as described in Example 3, to yield about 3.0 g. (=58.0% of theory) of the 1,3,4-oxidazole derivative of the formula

(95)
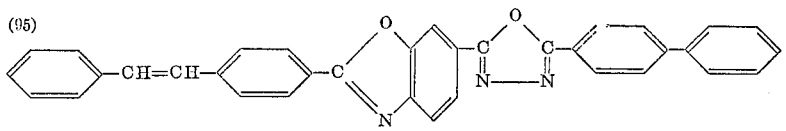

On recrystallization from dibutylphthalate+methanol and then from ortho-dichlorobenzene pale-yellow, fine needles melting at 317° to 317.5° C. are obtained.

*Analysis.*—$C_{35}H_{23}O_2N_3$ (molecular weight: 517.59). Calculated (percent): C, 81.22; H, 4.48; N, 8.12. Found (percent): C, 81.10; H, 4.39; H, 8.11.

The folowing 1,3,4-oxdiazole derivatives may be prepared in a similar manner, the crude product in each case being recrystallized once from dibutylphthalate+methanol:

(11)
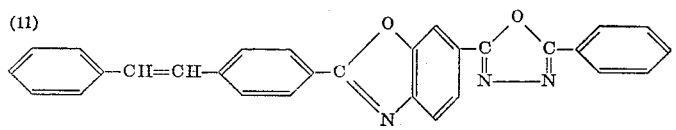

in a yield of 26.5% of theoretical, in faintly greenish yellow, fine needles from tetrachloroethylene, melting at 260° to 260.5° C.

*Analysis.*—$C_{29}H_{19}O_2N_3$ (molecular weight: 441.47). Calculated (percent): C, 78.89; H, 4.34; N, 9.52. Found (percent): C, 78.69; H, 4.44; N, 9.59.

| I | II | III | IV | V |
|---|---|---|---|---|
| 90 | ![structure] | 250–250.5 | $C_{28}H_{19}O_2N_3$: C 78.31, H 4.46, N 9.79 / C 78.58, H 4.61, N 9.96 | 2 |
| 91 | ![structure] | 281–282 | $C_{33}H_{21}O_2N_3$: C 80.64, H 4.31, N 8.55 / C 80.64, H 4.59, N 8.70 | 2 |
| 92 | ![structure] | 325–326 | $C_{41}H_{27}O_2N_3$: C 82.95, H 4.58, N 7.08 / C 82.70, H 4.31, N 7.12 | 2 |
| 93 | ![structure] | 297–299 | $C_{38}H_{28}O_3N_4$: C 77.53, H 4.79, N 9.52 / C 77.50, H 5.03, N 9.51 | 6 |

(96)
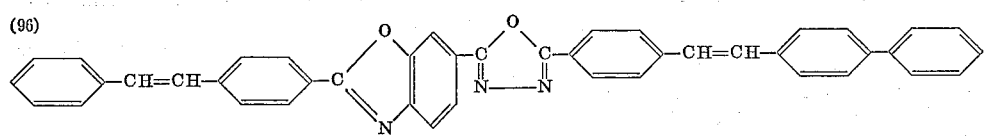

in a yield of 79% of the theoretical, in faintly yellowish, shiny, felted needles from ortho-dichlorobenzene, melting at 329° to 330° C.

Analysis.—$C_{42}H_{29}O_2N_3$ (molecular weight: 619.72). Calculated (percent): C, 83.34; H, 4.72; N, 6.78. Found (percent): C, 83.16; H, 4.68; N, 6.83.

The starting material, the carboxylic acid hydrazide of the Formula 94, melting at 304° to 307° C., can be obtained from the corresponding carboxylic acid methyl ester (melting at 213° to 214° C.) by reaction with excess hydrazine hydrate in methylglycol.

EXAMPLE 6

A mixture of 17.0 g. of the carboxylic acid chloride of the Formula 63, 1.25 g. of hydrazine hydrate and 8 g. of pyridine in 200 ml. of anhydrous ortho-dichlorobenzene is heated within 20 minutes to 100° to 110° C., while being stirred, then stirred on for 1 hour at this temperature and then within 15 to 30 minutes heated to 165° to 170° C. In the course of 15 minutes at 165° to 170° C. 12 g. of thionylchloride are dropped into the vigorously stirred, faintly yellowish suspension of the reaction product. The yellow suspension is stirred for another 5 minutes at this temperature, then cooled to about 20° C., and the precipitated 1,3,4-oxidazole derivative of the formula

(97)
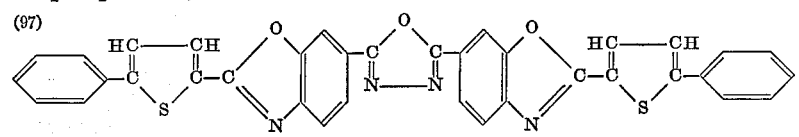

is suctioned off, washed with methanol, and dried, to yield about 13.4 g. (=86.4% of theory) of a yellow, crystalline powder which melts at 373° to 375° C. and after two recrystallizations from ortho-dichlorobenzene with the aid of bleaching earth forms yellow, shiny needles and flakes melting at 377° to 378° C.

Analysis.—$C_{36}H_{20}O_3N_4S_2$ (molecular weight: 620.71). Calculated (percent): C, 69.66; H, 3.25; N, 9.03. Found (percent): C, 69.82; H, 3.36; N, 9.14.

The following 1,3,4-oxdiazole derivatives are accessible in a similar manner:

(98)
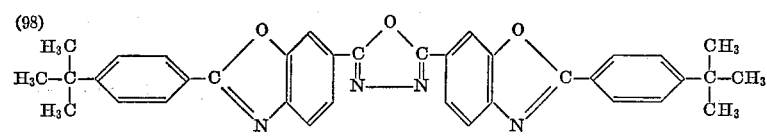

in a yield of 68.5% of the theoretical, in almost colourless, fine crystals from tetrachloroethylene, melting at 311° to 312° C.

Analysis.—$C_{36}H_{32}O_3N \cdot \frac{1}{10}C_2Cl_4$ (molecular weight: 585.23). Calculated (percent): C, 74.29; H, 5.50; N, 9.58; Cl, 2.42. Found (percent): C, 74.18; H, 5.61; N, 9.54; Cl, 1.89.

(99)
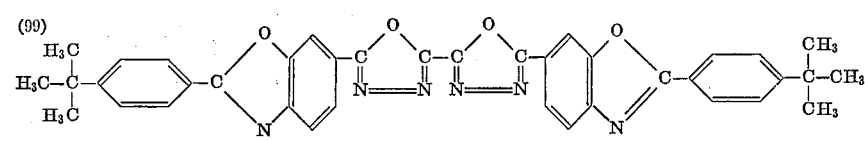

in a yield of 29.9% of the theoretical, in colourless, very fine needles from ortho-dichlorobenzene, melting at 373° to 374° C.

Analysis.—$C_{38}H_{32}O_4N_6$ (molecular weight: 636.68). Calculated (percent): C, 71.68; H, 5.07; N, 13.20. Found (percent): C, 70.98; N, 4.88; N, 12.89.

EXAMPLE 7

A polyester fabric (for example "Dacron") is padded at room temperature (about 20° C.) with an aqueous dispersion containing, per litre, 2 g. of the compound of the Formula 36 and 1 g. of an adduct from about 8 mols of ethylene oxide with 1 mol of para-tertiary octylphenol, and then dried at about 100° C. The dry material is then developed by a heat treatment for 30 seconds at 220° C. The material treated in this manner has a substantially whiter aspect than the untreated fabric.

EXAMPLE 8

100 grams of a polyester granulate from terephthalic acid ethyleneglycol polyester are intimately mixed with 0.01 g. of the compound of the Formula 16 and melted at 285° C. while being stirred. The spinning mass is spun through conventional spinnerets and stretched to furnish strongly brightened polyester fibres.

Alternatively, the compound of the Formula 16 may be added to the starting material before or during the polycondensation leading to the polyester.

Good brightening effects are also obtained when the compound of the Formula 16 is replaced by the compound of the Formula 37, 62, 67, 92, 95 or 96.

EXAMPLE 9

10,000 parts of a polyamide in chip form, prepared in the known manner from ε-caprolactam, are mixed for 12 hours in a tumbler with 30 parts of titanium dioxide (rutile modification) and 5 parts of the compound of the Formula 16, 60, 65, 67, 92 or 96. The chips treated in this manner are then melted in a boiler from which the atmospheric oxygen has been displaced and which is heated at 270° C., and the melt is stirred for half an hour. The melt is then expressed through a spinneret under a nitrogen pressure of 5 atmospheres (gauge) and the cooled filament is wound up on a spinning bobbin. The filaments thus obtained display a good brightening effect.

Similar brightening effects can be achieved on a polyamide from hexamethylenediamine adipate.

What is claimed is:

1. A benzoxazolyl-1,3,4-oxadiazole derivative of the formula

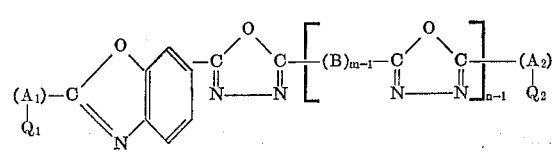

wherein $A_1$ represents a member selected from the group consisting of
 (a) phenyl,
 (b) 4-(2 - oxdiazol-[1,3,4]-yl)phenyl which is substituted in position 5 of the oxdiazolyl residue with phenyl, 2-thienyl, 2-(5-phenyl)thienyl or 4-stilbenyl,
 (c) 2-(5-phenyl)thienyl,
 (d) 4-diphenylyl,
 (e) 4-stilbenyl, and
 (f) styryl, $A_2$ represents a member selected from the group consisting of
 (a) phenyl,
 (b) 4-(2-benzoxazolyl)phenyl,
 (c) 2-thienyl,
 (d) 2-thienyl substituted in position 5 with phenyl or 2-benzoxazolyl,
 (e) 4-stilbenyl,
 (e') 4-(4'-phenyl)stilbenyl,
 (f) β-naphthyl,
 (g) 4-diphenylyl,
 (h) α-, β- or γ-pyridyl,
 (i) when $n$ is 1, 4-(2-oxidiazol-[1,3,4]-yl)phenyl substituted in position 5 of the oxadiazolyl with 4-diphenylyl,
 (j) 2-oxdiazol-[1,3,4]-yl substituted in position 5 with 6-(2-phenyl)benzoxazolyl,
 (k) 6-benzoxazolyl substituted in position 2 with phenyl, 4-diphenylyl, alkyl of 1 to 4 carbon atoms or 2-(5-phenyl)-thienyl, and wherein $Q_1$ and $Q_2$ represents up to two substituents in the terminal phenyl groups in $A_1$ and $A_2$ and are hydrogen, chlorine, alkyl containing from 1 to 6 carbon atoms or alkoxy containing from 1 to 6 carbon atoms, B represents an unsubstituted 1,4-phenylene and wherein $m$ and $n$ each is a whole number 1 or 2.

2. The compound of claim 1, wherein $m$ and $n$ are 1.

3. A benzoxazolyl-1,3,4-oxadiazole derivative of the formula

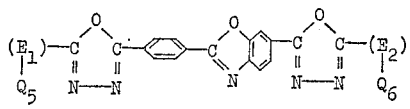

wherein $E_1$ represents a member selected from the group consisting of phenyl, 4-stilbenyl, 2-thienyl and 2-(5-phenyl)-thienyl, $E_2$ represents a member selected from the group consisting of phenyl, 4-stilbenyl, 2-thienyl and 2-(5-phenyl)-thienyl, wherein $Q_5$ and $Q_6$ are each a single substituent in the terminal phenyl groups in $E_1$ and $E_2$ and are hydrogen, chlorine, alkyl having from 1 to 6 carbon atoms or alkoxy having from 1 to 4 carbon atoms.

4. A benzoxazolyl-1,3,4-oxadiazole derivative having the formula

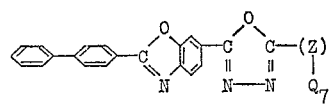

where Z represents a member selected from the group consisting of phenyl, 4-diphenylyl, 4-(4'-phenyl)-stilbenyl and 6-(2-phenyl)-benzoxazolyl, wherein $Q_7$ is a substituent in the terminal phenyl group of group Z and is hydrogen or alkyl having up to 6 carbon atoms.

5. A benzoxazolyl-1,3,4-oxadiazole derivative having the formula

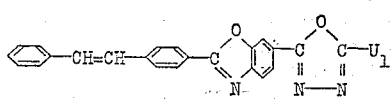

where $U_1$ represents a member selected from the group consisting of phenyl, 4-diphenylyl, 4-stilbenyl and 4-(4'-phenyl)-stilbenyl.

6. A benzoxazolyl-1,3,4-oxadiazole derivative having the formula

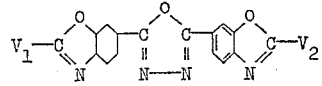

where $V_1$ and $V_2$ represents a member selected from the group consisting of phenyl and 2-(5-phenyl)-thienyl.

7. A benzoxazolyl-1,3,4-oxadiazole derivative having the formula

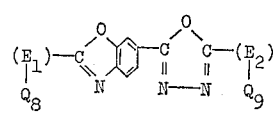

where $E_1$ represents a member selected from the group consisting of phenyl and 2-(5-phenyl)-thienyl, $E_2$ represents a member selected from the group consisting of phenyl, 4-diphenylyl, β-naphthyl, 4-stilbenyl, 2-thienyl, 6-benzoxazolyl substituted in position 2 with phenyl or 2-(5-phenyl)-thienyl, and wherein $Q_8$ and $Q_9$ are a single substituent in the terminal phenyl groups in $E_1$ and $E_2$ and are hydrogen, chlorine, alkyl having from 1 to 6 carbon atoms or alkoxy having from 1 to 4 carbon atoms.

8. A compound having the formula

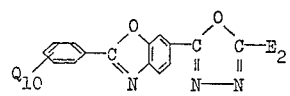

wherein $E_2$ is 4-(2-benzoxazolyl)-phenyl, 2-(5-phenyl)-thienyl or 2-[5-(2-benzoxazolyl)]-thienyl and $Q_{10}$ is hydrogen or lower-alkyl having from 1 to 6 carbon atoms.

9. The compound according to claim 1 having the formula

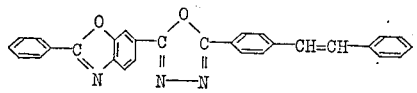

10. The compound according to claim 1 having the formula

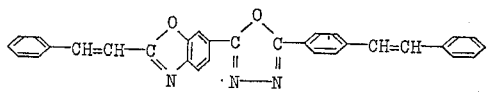

11. The compound according to claim 1 having the formula

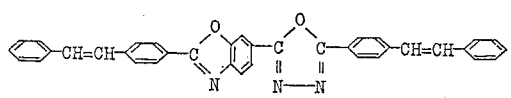

12. The compound according to claim 1 having the formula

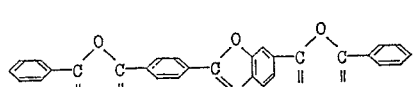

13. The compound according to claim 1 having the formula

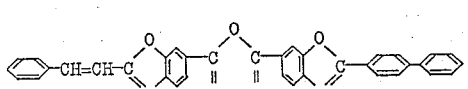

(References on following page)

References Cited

UNITED STATES PATENTS 3,328,310  6/1967  Maeder et al. ........ 260—307

HENRY R. JILES, Primary Examiner

H. I. MOATZ, Assistant Examiner

U.S. Cl. X.R.

8—1 W, 73; 117—33.5 R T; 252—301.3 W; 260—2 R, 6, 13, 15, 46.5 R, 47 R, 63 R, 67 R, 75 R, 77.5 R, 78 R, 79.7, 80 R, 80.3 R, 82.1, 85.5 ZA, 85.7, 86.1 R, 87.5 R, 87.7 R, 88.1 R, 88.3 R, 88.7 R, 89.1, 89.7 R, 89.5, 91.1 R, 91.3, 92.8 R, 93.5 R, 93.7, 94.8, 94.9, 290 D, 294.8R, 294.8 D, 294.8 F, 294.9, 295 AM, 295 K, 296 B, 297 B, 307 D